UNITED STATES PATENT OFFICE 2,279,509

GLYCEROL DICHLORHYDRIN

Edgar C. Britton and Harold R. Slagh, Midland, Mich., assignor to The Dow Chemical Company, Midland, Mich., a corporation of Michigan No Drawing. Application July 20, 1939,
Serial No. 285,582

11 Claims. (Cl. 260—633)

This invention concerns the use of organic solvents in the purification of glycerol dichlorohydrin.

When glycerol is reacted with hydrogen chloride in the presence of a suitable catalyst such as acetic acid to form glycerol dichlorohydrin and 2 molecules of water, the known processes either allow the water of reaction to accumulate in the reaction zone or drive the water out of the reaction mixture by conducting the reaction at elevated temperatures, i. e., approximately 120° C. or higher. If the water of reaction be allowed to accumulate in the process, there is obtained on fractional distillation of the mixed reaction product a substantial fraction composed of water, hydrogen chloride, acetic acid and glycerol dichlorohydrin. If water is distilled from the reaction zone at elevated temperatures during the reaction, considerable quantities of glycerol dichlorohydrin, acetic acid, and hydrogen chloride are carried out therewith to form a similar corrosive mixture. Losses of glycerol dichlorohydrin in the above aqueous fractions are considerable. The literature describes several methods for the partial recovery of dichlorohydrin therefrom which involve complicated distillation methods and/or neutralization of said acid fractions with soda ash or similar alkalies. It has been found impossible to separate more than a small portion of dissolved dichlorohydrin product from these solutions by distillation, and while neutralization of the corrosive mixtures with soda ash, etc., accomplishes a better separation than does distillation, glycerol dichlorohydrin has a considerable solubility in water and salt solutions, and the method fails in recovery of a substantial portion of the desired product. Furthermore, neither of the above procedures is particularly adapted to produce an anhydrous product, considerable amounts of water being present in glycerol dichlorohydrin recovered from aqueous hydrogen chloride solutions according to the known methods.

We have discovered that by extracting the above-described glycerol dichlorohydrin-containing acid fractions with a liquid chlorinated aliphatic hydrocarbon, the major proportion of the desired dichlorohydrin product may be recovered, and, furthermore, that fractional distillation of the extract so obtained yields essentially anhydrous glycerol dichlorohydrin. The essential characteristics of the liquid chlorinated aliphatic hydrocarbons which render them particularly suitable in the extraction of glycerol dichlorohydrin are that (1) they have a high extraction coefficient for glycerol dichlorohydrin in aqueous acid solution; that is, the solubility of glycerol dichlorohydrin in such solvents is such that the major proportion of the dichlorohydrin product is conveniently extracted from solution in the water or aqueous hydrochloric acid, (2) they do not extract appreciable quantities of hydrochloric acid from the treated corrosive mixtures, (3) they are relatively immiscible with water, (4) they are readily separable from the extracted aqueous solution as by decantation and from glycerol dichlorohydrin as by distillation, and (5) they are relatively inert; that is, they do not tend to react with glycerol dichlorohydrin in hydrochloric acid or to be hydrolyzed during the extracting and distilling steps. The chlorinated aliphatic hydrocarbons with which this invention is particularly concerned are those which are liquid at ordinary temperatures and which contain not in excess of 6 carbon atoms.

In carrying out our process, the water or aqueous hydrochloric acid solution of glycerol dichlorohydrin which may or may not contain dissolved acetic acid or other reaction catalyst is intimately contacted with the solvent, the resulting mixture allowed to layer out, and the glycerol dichlorohydrin-containing solvent layer separated from the aqueous residue. If necessary, several extractions of the aqueous glycerol dichlorohydrin solution may be made, after which the various extractions may conveniently be combined and the glycerol dichlorohydrin separated therefrom by fractional distillation. Small amounts of water present in such combined extracts are removed therefrom as a steam distillate along with portions of the solvent during the first stages of the fractionation, the glycerol dichlorohydrin being recovered in substantially anhydrous form as generally a higher-boiling fraction. If desired, the extract may be treated with small amounts of sodium carbonate or other suitable alkaline material prior to the distillation step to remove traces of acetic acid and/or hydrochloric acid which may be present in said extract.

The following examples illustrate the use of certain representative liquid chlorinated aliphatic hydrocarbons in the carrying out of our invention, but are not to be construed as limiting the same:

Example 1

38.4 pounds of glycerol and 1.75 pounds of glacial acetic acid were mixed together in a glass reactor and gaseous hydrogen chloride slowly introduced thereinto, the reaction temperature being maintained at between 115° C. and 120° C. Water formed in the reaction continuously distilled from the reaction zone along with portions of the glycerol dichlorohydrin product, acetic acid catalyst, and hydrogen chloride, the mixture being condensed and collected as an acid fraction. At the end of 56 hours, the formation of water had substantially ceased and analysis of an aliquot portion of the reaction mixture indicated an approximately theoretical chlorine content. The 38.1 pounds of crude glycerol dichlorohydrin product remaining in the reaction flask was then fractionally distilled under reduced pressure, whereby there was obtained 0.3 pound of a low-boiling aqueous acid fraction, 31.0 pounds of substantially pure glycerol dichlorohydrin, 3.2 pounds of glycerol monochlorohydrin, and 3.6 pounds of high-boiling residue. The 31.0 pounds of desired product represented a yield of only 57.5 per cent of theoretical based on the glycerol used as a starting material.

The 30.9 pounds of acid fraction recovered as a distillate from the reaction zone during the hydrogen chloride addition was extracted three times with ethylene chloride. Each extraction required between 6 and 8 pounds of solvent and the total weight of ethylene chloride employed was 20.5 pounds. The extracts so obtained were combined and fractionally distilled, whereby an additional 8.1 pounds of substantially anhydrous glycerol dichlorohydrin was recovered. The total yield of product was, therefore, 39.1 pounds of glycerol dichlorohydrin, representing a theoretical yield of 72.5 per cent. 20.25 pounds, approximately 99 per cent, of the ethylene chloride used in the extraction was recovered and re-utilized in subsequent runs.

*Example 2*

In a similar manner, 253 grams of an acid fraction containing 63.2 grams of dissolved glycerol dichlorohydrin and 63.2 grams of hydrogen chloride was successively extracted with 151.5, 145.5, and 149.5 gram portions of 1,1,2-trichloroethane, whereby 28.2, 15.2, and 6.2 grams, respectively, of dichlorohydrin product was removed from aqueous solution. Fractional distillation of the combined extracts resulted in the isolation of 49.6 grams of substantially anhydrous glycerol dichlorohydrin, which represents a recovery of 78.5 per cent of theory.

*Example 3*

An acid fraction comprising 49.5 grams of glycerol dichlorohydrin and 148.5 grams of a 33⅓ per cent equeous hydrochloric acid solution was subjected to three extractions with ethylene chloride. The 126.0, 122.0, and 124.5 gram portions of solvent employed in the extraction removed 23.0, 11.5, and 5.0 grams of dichlorohydrin product, respectively, from the aqueous solution. Combination of the above extracts and fractional distillation under reduced pressure resulted in the isolation of 39.5 grams of substantially anhydrous and acid-free glycerol dichlorohydrin, which represents a recovery of 80 per cent of theoretical.

*Example 4*

Extraction of 200 grams of an acid fraction consisting essentially of 50 grams of glycerol dichlorohydrin and 150 grams of 33⅓ per cent hydrochloric acid with 115.5, 119.0, and 108.5 gram portions of propylene chloride and fractional distillation of the combined extracts resulted in the recovery of 39.2 grams of desired product or 78.4 per cent of theory.

While the foregoing examples describe the multiple extraction of acid fractions to recover glycerol dichlorohydrin therefrom, in plant operation the amount of extraction solvent required may be considerably reduced by subjecting the acid fraction to continuous extraction. In this modification of procedure, the acid fraction is extracted with a relatively small volume of solvent, small portions of which are continuously withdrawn from the extraction zone into a suitable fractionation apparatus, wherein the low-boiling solvent and traces of water present in the extract are distilled off and returned to the extraction zone, glycerol dichlorohydrin being retained in the body of the distilling apparatus as a residue. When no additional glycerol dichlorohydrin can be removed from the aqueous acid fraction, the extraction operation is suspended and the accumulated still residue of glycerol dichlorohydrin product is fractionated to obtain the desired compound in substantially pure form. In plant operation employing ethylene chloride as the solvent, an aqueous acid fraction originally containing 25 per cent by weight of glycerol dichlorohydrin was found, after extraction, to contain only 3 per cent by weight of said compound dissolved therein.

Among other solvents which have been found satisfactory as extractants in our process are butylene chloride, normal hexyl chloride, normal amyl chloride, chloroform, etc. If desired, mixtures of two or more solvents may be employed. For example, butyl chloride-carbon tetrachloride, propylene chloride-ethylene chloride, ethylene chloride-carbon tetrachloride mixtures, etc. Such combinations of solvents are of particular value where it is desired (1) to reduce fire hazard and flammability of the reaction mixture, and (2) to obtain some particular specific gravity for the extracting solvent in order to facilitate separation of said extractant from the aqueous acid fraction.

The present application is a continuation-in-part of our co-pending and prior filed application, Serial No. 100,211, filed September 10, 1936.

Other modes of applying the principle of our invention may be employed instead of those explained, change being made as regards the methods herein disclosed, provided the step or steps stated by any of the following claims or the equivalent of any such stated step or steps be employed.

We therefore particularly point out and distinctly claim as our invention:

1. In the recovery of glycerol dichlorohydrin from an aqueous solution comprising the same, the steps which consist of extracting said solution with ethylene chloride.

2. In the recovery of glycerol dichlorohydrin from an aqueous solution comprising the same, the steps which consist of extracting said solution with ethylene chloride, and thereafter separating the glycerol dichlorohydrin from the ethylene chloride by fractional distillation.

3. In the recovery of glycerol dichlorohydrin from an aqueous hydrochloric acid solution comprising the same, the step which consists of extracting said solution with ethylene chloride.

4. In the recovery of glycerol dichlorohydrin from an aqueous hydrochloric acid solution comprising the same, the steps which consist of extracting said solution with ethylene chloride and thereafter separating the glycerol dichlorohydrin from the ethylene chloride.

5. In the extraction of glycerol dichlorohydrin from an aqueous hydrochloric acid solution comprising the same, the steps which consist of intimately contacting said solution with ethylene chloride, withdrawing the resulting solvent-glycerol dichlorohydrin extract from the extraction zone, and thereafter removing residual water and ethylene chloride from said extract by fractional distillation, whereby glycerol dichlorohydrin is obtained in substantially anhydrous condition.

6. In the recovery of glycerol dichlorohydrin from an aqueous solution comprising the same, the step which consists of extracting said solution with propylene chloride.

7. In the recovery of glycerol dichlorohydrin from an aqueous hydrochloric acid solution comprising the same, the steps which consist of extracting said solution with propylene chloride and thereafter separating the glycerol dichlorohydrin from the propylene chloride.

8. In the extraction of glycerol dichlorohydrin from an aqueous hydrochloric acid solution comprising the same, the steps which consist of intimately contacting said solution with propylene chloride, withdrawing the resulting solvent-glycerol dichlorohydrin extract from the extraction zone, and thereafter removing residual water and propylene chloride from said extract by fractional distillation, whereby glycerol dichlorohydrin is obtained in substantially anhydrous condition.

9. In the recovery of glycerol dichlorohydrin from an aqueous solution comprising the same, the steps which consist of extracting said solution with an alkylene chloride selected from the group consisting of ethylene chloride and propylene chloride, and thereafter separating the glycerol dichlorohydrin from such solvent by fractional distillation.

10. In the recovery of glycerol dichlorohydrin from an aqueous hydrochloric acid solution comprising the same, the step which consists of extracting said solution with an alkylene chloride selected from the group consisting of ethylene chloride and propylene chloride.

11. In the extraction of glycerol dichlorohydrin from an aqueous hydrochloric acid solution comprising the same, the steps which consist of intimately contacting said solution with an alkylene chloride selected from the group consisting of ethylene chloride and propylene chloride, withdrawing the resulting solvent glycerol dichlorohydrin extract from the extraction zone, and thereafter removing residual water and solvent from said extract by fractional distillation whereby glycerol dichlorohydrin is obtained in substantially anhydrous condition.

EDGAR C. BRITTON.
HAROLD R. SLAGH.